United States Patent [19]

Tyson

[11] Patent Number: 4,834,320

[45] Date of Patent: May 30, 1989

[54] METHOD AND SYSTEM FOR REDUCING AIRCRAFT STOPPING DISTANCE

[75] Inventor: Ray M. Tyson, Palos Verdes, Calif.

[73] Assignee: Rockwell International Corporation, El Segundo, Calif.

[21] Appl. No.: 136,326

[22] Filed: Dec. 22, 1987

[51] Int. Cl.⁴ ............................................. B64B 25/36
[52] U.S. Cl. ........................... 244/103 R; 244/100 R; 291/12
[58] Field of Search ....................... 244/103 R, 100 R; 180/89.2, 84; 291/12, 13, 3; 239/174

[56] References Cited

U.S. PATENT DOCUMENTS

| | | | |
|---|---|---|---|
| 2,199,883 | 5/1940 | Ishiwata | 180/313 |
| 2,677,516 | 5/1954 | Pilling | 244/103 R |
| 3,182,934 | 5/1965 | Clark | 244/103 R |
| 3,339,865 | 9/1967 | Nettles | 244/103 R |
| 3,680,885 | 8/1972 | DeCandi et al. | 244/103 R |
| 3,831,689 | 8/1974 | Smith | 180/313 |
| 4,203,423 | 5/1980 | Ricci | 291/3 |
| 4,230,045 | 10/1980 | Fearon | 239/174 |
| 4,324,307 | 4/1982 | Schittino et al. | 180/313 |

*Primary Examiner*—Joseph F. Peters, Jr.
*Assistant Examiner*—Rodney Corl
*Attorney, Agent, or Firm*—Charles T. Silberberg; Max Geldin

[57] ABSTRACT

A method and system for reducing stopping distance for an aircraft on a wet runway, which includes blowing away water on a wet landing surface in front of the aircraft tires so that the tires contact a relatively dry surface and simultaneously blowing air on the tires to remove water that may have collected on them. The system includes ducting from the aircraft engine to the landing gear to receive high pressure air bled from the aircraft engine and nozzles connected to the ducting for exhausting high pressure air to the runway in front of the wheels and to the rear portion of the tires. A system of valves in the ducting can be actuated by switches in the cockpit to bleed high pressure air from the engine to the ducting and nozzles during landing of the aircraft.

6 Claims, 1 Drawing Sheet

METHOD AND SYSTEM FOR REDUCING AIRCRAFT STOPPING DISTANCE

BACKGROUND OF THE INVENTION

This invention relates to reducing stopping distance of aircraft during landing on wet runways, and is particularly directed to a method and system for reducing stopping distance of aircraft on a wet landing surface by removal of water from the landing surface directly ahead of the aircraft tires simultaneously with removal of water from the tires.

When landing on a wet landing surface or a wet runway, it is particularly desirable that the aircraft be controlled to reduce stopping distance. Water on runways increases the distance required to stop aircraft. However, future aircraft may be required to have short landing distances on wet runways.

Presently, shorter stopping distance for aircraft during landing is provided by employment of methods and devices such as a thrust reverser or drag chute.

However, the presently employed methods and devices for reducing stopping distance of aircraft on wet landing surfaces are expensive, complex and/or are not efficient.

The following patents are illustrative of prior art methods and systems directed chiefly towards removal of water and other matter from the wheels of a vehicle or the adjacent surface being traversed.

U.S. Pat. No. 4,230,045 discloses a device which squirts a high-pressure cleaning liquid on railroad tracks ahead of the wheels and then blows it dry with a jet of high pressure air. This device requires a compressor driven by the railroad engine.

U.S. Pat. No. 2,199,883 discloses apparatus using a fan to pump air to the back end of an automobile and aft of its wheels to suppress dust and mud splashing. It does not deal with water removal from a road or landing surface.

U.S. Pat. No. 3,831,689 employs a "scraper" type mechanical device to move water and other objects away from tires of an automobile to improve braking capability.

U.S. Pat. No. 4,324,307 discloses a device which ducts automobile engine exhaust having very low pressure, in front of the rear tires of the automobile to melt snow and ice. Such exhaust system could not operate to remove water from an aircraft runway at the high landing speeds of an aircraft, usually greater than 100 mph, since low pressure exhaust could not exert enough force on the water.

Accordingly, one object of the present invention is to provide a relatively simple method and system for efficiently reducing stopping distance of aircraft on wet landing surfaces.

Another object is the provision of a novel method and system for removing water from a wet landing surface directly in front of the aircraft, and simultaneously removing water from the aircraft tires, to thereby permit efficient application of braking power and reduction in stopping distance.

SUMMARY OF THE INVENTION

The above objects and advantages are achieved according to the invention for reduction of aircraft landing distance on wet landing surfaces, by blowing away the water in front of the tires of the aircraft, so that the tires contact a dry or nearly-dry surface, and by simultaneously blowing on the tires to remove water which may have collected on them.

In carrying out the method of the invention, high pressure air can be bled from the aircraft engine or from an auxiliary power unit. The air is then ducted to exhaust in front of the tires to blow away water on the landing surface and at the back of the tires to remove water therefrom. For this purpose, a nozzle is provided for discharging high pressure air from the ducting so as to strike the wet landing surface directly ahead of the aircraft tires and another nozzle is provided which discharges high pressure air from the ducting to impinge same at the rear of the aircraft tires to remove any water thereon.

BRIEF DESCRIPTION OF THE DRAWINGS

The invention will be more clearly understood from the detailed description of the invention below, taken in conjunction with the accompanying drawings wherein.

DETAILED DESCRIPTION OF THE INVENTION AND PREFERRED EMBODIMENTS

Figure 1:
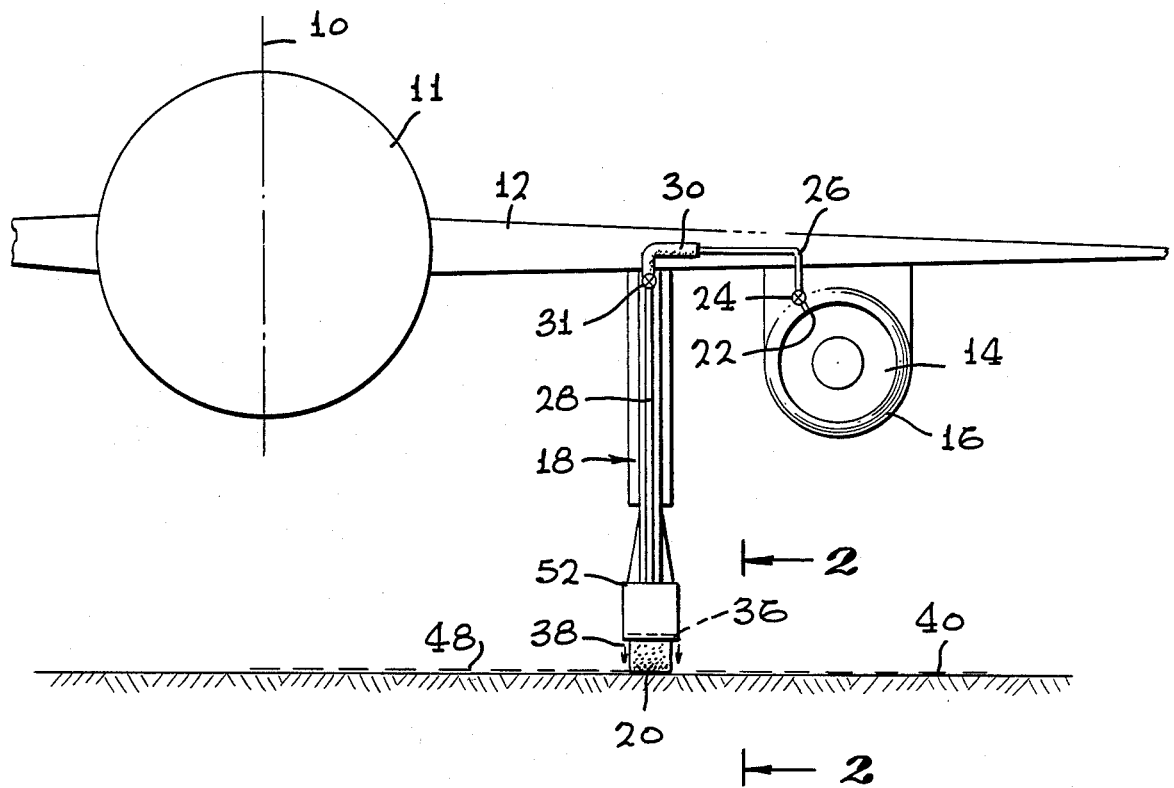
FIG. 1 is a front view of one side of the aircraft, showing the landing gear, ducting and other components of the system of the invention.

Referring to FIG. 1 of the drawing, showing one side of an aircraft, from the vertical plane 10, the other side of the aircraft being symmetrical and containing the same components shown in FIG. 1. Numeral 11 represents the fuselage, with the wing 12 connected thereto in the usual manner, and supporting the aircraft engine 14 in an engine nacelle 16. A landing gear indicated at 18 is provided, to which is connected in the usual manner the wheel or wheels 20. The landing gear 18 and wheel 20 mounted thereon is arranged to be folded in a clockwise manner from its position shown in FIG. 1, into the wing 12, in the usual manner during flight, and lowered to its position shown in FIG. 1 during landing of the aircraft. The structure for raising and lowering the landing gear 18 is conventional and forms no part of the present invention, and hence is not shown.

According to the invention, a high pressure air bleed from the aircraft engine 14 is provided at 22 and a first shut-off valve 24 is provided in the bleed line 22, which is actuated by a switch (not shown) in the cockpit. The bleed line 22 containing valve 24 communicates with ducting 26 which extends downwardly at 28 along the landing gear 18, with a flexible hose 30 interconnecting the ducting 26 with the ducting 28, to permit for retraction of the landing gear.

According to the preferred embodiment, a second shut-off valve 31 is provided in the ducting 28 downstream from the first valve 24, and which can be actuated by another switch (not shown) in the cockpit, to open valve 31 when the weight of the aircraft is on the wheels thereof, that is at the point of landing. However, alternative means such as an automatic sensor means can be used to actuate valve 31 when the aircraft touches down on the landing surface.

Figure 2:
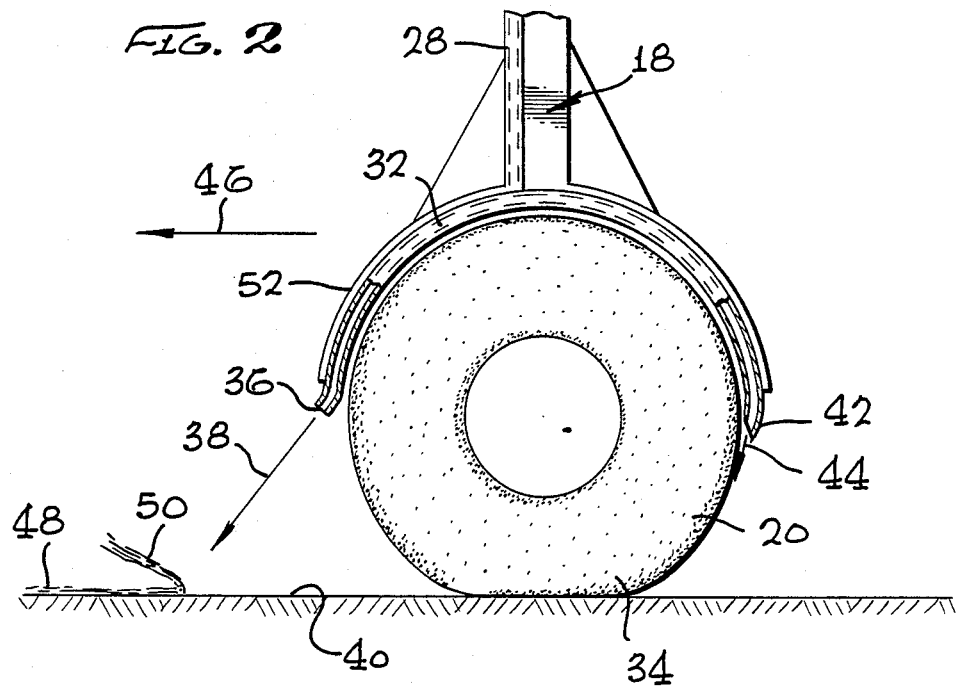
FIG. 2 is an enlarged partial side view taken on line 2—2 of FIG. 1 of the landing gear, ducting and nozzles associated therewith for discharge of high pressure air from the ducting and through the nozzles for efficient removal of water from the runway and from the tire, to reduce aircraft stopping distance, according to the invention.

Now referring to FIG. 2 of the drawing, it will be seen that ducting 28 terminates at its lower end in a semicircular shaped ducting 32 which is positioned around the upper half portion of the aircraft wheel 20 and closely adjacent the tire 34 on the wheel. The ducting 32 is preferably placed as close to the tire 34 as is practical, e.g. about ½" to about 1" from the tire. An air exhaust nozzle 36 is provided at the front end of the semicircular ducting 32 and is arranged to discharge an air jet at 38 against the wet runway surface 40 directly in front of the wheel 20.

A second air exhaust nozzle 42 is connected to the opposite rear end of the semicircular ducting 32 and is pointed at the rear of the tire 34 for discharging an air jet 44 from the ducting 32 against the rear of the tire 34.

In operation, on landing approach with a wet runway, the pilot switches open the valve 24 to allow bleed air to fill ducting 26. When the aircraft touches down on the runway, the pilot switches open the second valve 31. Assuming that the aircraft is moving from right to left, as indicated by the arrow 46 in FIG. 2, high pressure bleed air is dishcarged from the front end of ducting 32 through nozzle 36 and the resulting air jet 38 strikes the wet runway 40 in front of the wheel 20, blowing away the water 48 on the runway in front of the wheel, as indicated at 50. Simultaneously, high pressure bleed air is discharged from the other end of the semicircular ducting 32 through the nozzle 42, and the resulting air jet 44 impinges on the rear surface of the tire 34 to remove water from the tire.

As noted above, the other side of the aircraft from that shown in FIG. 1, contains the same water removal system as shown in FIG. 1, so that water is removed in front of the wheels on both sides of the aircraft, and water is removed from the rear of the tires on the wheels on both sides of the aircraft, according to the invention, providing matched braking power on both sides of the aircraft, and substantially reducing the stopping distance of the aircraft.

The high pressure bleed air from the aircraft engine is provided at sufficient pressure to effect efficient removal of water from the runway by the impinging jet thereon, and to provide efficient removal of water from the aircraft tire, as described above. Thus, the air bled from the aircraft engine can have a pressure ranging from about 30 to about 300 psi.

In the preferred embodiment, an optional fender 52 can be employed for supporting the semicircular ducting 32 near the tire 34, and the nozzles 36 and 42 communicating with such ducting.

It will be understood that various changes and modifications in the invention method and system can be made by those skilled in the art. Thus, although it is preferred to employ high pressure air bled from an aircraft engine for purposes of the invention, other high pressure air sources can be employed, such as an auxiliary power unit of an aircraft. Further, instead of employing two valves 24 and 31, a single valve can be employed for immediately discharging high pressure bleed air from the engine through the ducting and nozzles 36 and 42 as soon as the aircraft lands on a runway, with the aircraft weight on the wheels.

Instead of employing single nozzles at 36 and 42, multiple nozzles or a "V" shaped slot exhaust nozzle can be employed, for efficient water removal over a wide area.

The invention method and system can be employed on any aircraft for which shorter landing distance is desired on wet runways, and can also be used on other land vehicles such as cars, trucks, buses, and the like, for reducing stopping distance on wet surfaces, if a high pressure gas source is available.

From the foregoing, it is seen that the invention provides a novel and relatively simple method and system particularly designed for removing water from the surface in front of the tires of an aircraft landing on a wet runway, and simultaneously from the tires thereof, to allow good tire contact with the runway and substantially reduce stopping distance. Thus, the invention eliminates the need for conventional thrust reversers, drag chutes and other devices conventionally employed for reducing stopping distance of aircraft on a wet runway.

Since various further modifications of the method and system of the invention will occur to those skilled in the art, within the spirit of the invention, the invention is not to be taken as limited except by the scope of the appended claims.

I claim:

1. A system for reducing stopping distance of aircraft on wet runways, which comprises in combination with the aircraft engine, landing gear, wheels and tires thereon,
   means for bleeding high pressure air from said engine,
   ducting means for receiving said high pressure air, said ducting means extending to the landing gear and around the wheels closely adjacent to the tires thereon, the portion of said ducting means extending around the wheels being substantially in the form of a semicircle,
   first air exhaust nozzle means on said ducting means directed toward the runway in front of the wheels to blow away water on the runway, and
   second air exhaust nozzle means on said ducting means directed at the rear of the tires to remove water from the tires.

2. The system of claim 1, said first nozzle means connected to one end of said semicircular ducting means in front of the wheels, and said second nozzle means connected to the other end of said semicircular ducting means at the rear of the wheels.

3. The system of claim 2, including a fender to support said ducting means around said wheels, and to support said first nozzle means and said second nozzle means.

4. The system of claim 2, including
   first valve means in said ducting,
   means for actuating said first valve means to open same for filling said ducting means with high pressure bleed air from said engine,
   second valve means in said ducting means downstream from said first valve means,
   means actuating said second valve means to open same when the aircraft weight is on the wheels, for discharging said high pressure air from said ducting means through said first nozzle means and through said second nozzle means.

5. The system of claim 1, including
   valve means in said ducting means, and
   means actuating said valve means to open same when the aircraft weight is on the wheels, for discharging said high pressure air into said ducting means and through said first and second nozzle means.

6. The system of claim 1, including
   first valve means in said ducting means, means for actuating said first valve means to open same for filling said ducting means with high pressure bleed air from said engine,
second valve means in said ducting means downstream from said first valve means,
means actuating said second valve means to open same when the aircraft weight is on the wheels, for discharging said high pressure air from said ducting means through said first nozzle means and through said second nozzle means.

* * * * *